United States Patent [19]

Cooper

[11] 4,441,562
[45] Apr. 10, 1984

[54] FOLDABLE TILLAGE IMPLEMENT

[76] Inventor: Hugh E. Cooper, 1253 Tilton Park Dr., Rochelle, Ill. 60168

[21] Appl. No.: 299,510

[22] Filed: Sep. 4, 1981

[51] Int. Cl.³ .............................................. A01B 73/00
[52] U.S. Cl. .................................... 172/311; 172/456; 172/587
[58] Field of Search ............... 172/311, 328, 383, 386, 172/396, 454, 455, 456, 507, 581, 582, 583, 568, 584, 587, 588, 595, 596, 649, 650, 651, 652, 655, 625; 280/411 A, 411 B, 411 C, 411 R, 656

[56] References Cited

U.S. PATENT DOCUMENTS

| 297,666 | 4/1884 | Bramer | 172/587 |
|---|---|---|---|
| 3,572,445 | 3/1971 | Richey et al. | 172/581 X |
| 3,692,121 | 9/1972 | Kenney | 172/568 X |
| 3,912,017 | 10/1975 | Rehn | 172/328 |
| 4,066,274 | 1/1978 | Adee | 172/595 X |
| 4,154,451 | 5/1979 | Young | 280/411 X |
| 4,223,743 | 9/1980 | Garrison | 172/311 X |
| 4,327,932 | 5/1982 | Anderson | 172/587 X |
| 4,355,690 | 10/1982 | Jensen et al. | 172/311 |

FOREIGN PATENT DOCUMENTS 1139046 1/1969 United Kingdom ................ 172/584

Primary Examiner—Richard T. Stouffer
Assistant Examiner—William H. Honaker
Attorney, Agent, or Firm—Emrich, Lee, Brown & Hill

[57] ABSTRACT

A disk harrow embodies a fore-and-aft extending center pole which hitches at one end to a tractor and has paired tool gang assembly units which extend laterally from opposite sides thereof. These units include tool gang carrying inner beams which are supported on transport wheels and are connected to said pole for horizontal adjustment about pivots spaced along the longitudinal axis of the pole, one behind the other. Adjustable length truss bars connected between the pole and the inner beams releasably lock said tool gang assembly units in a transport position generally perpendicular to the pole. The tool gang assembly units also include a tool gang carrying outer beam which is hinged to the inner beam to fold vertically thereover onto the pole when the units are perpendicular thereto. The spacing of the pivots provides sufficient clearance that the folded outer beams lie flat with their tools in close side-by-side relation on the pole for transport.

9 Claims, 5 Drawing Figures

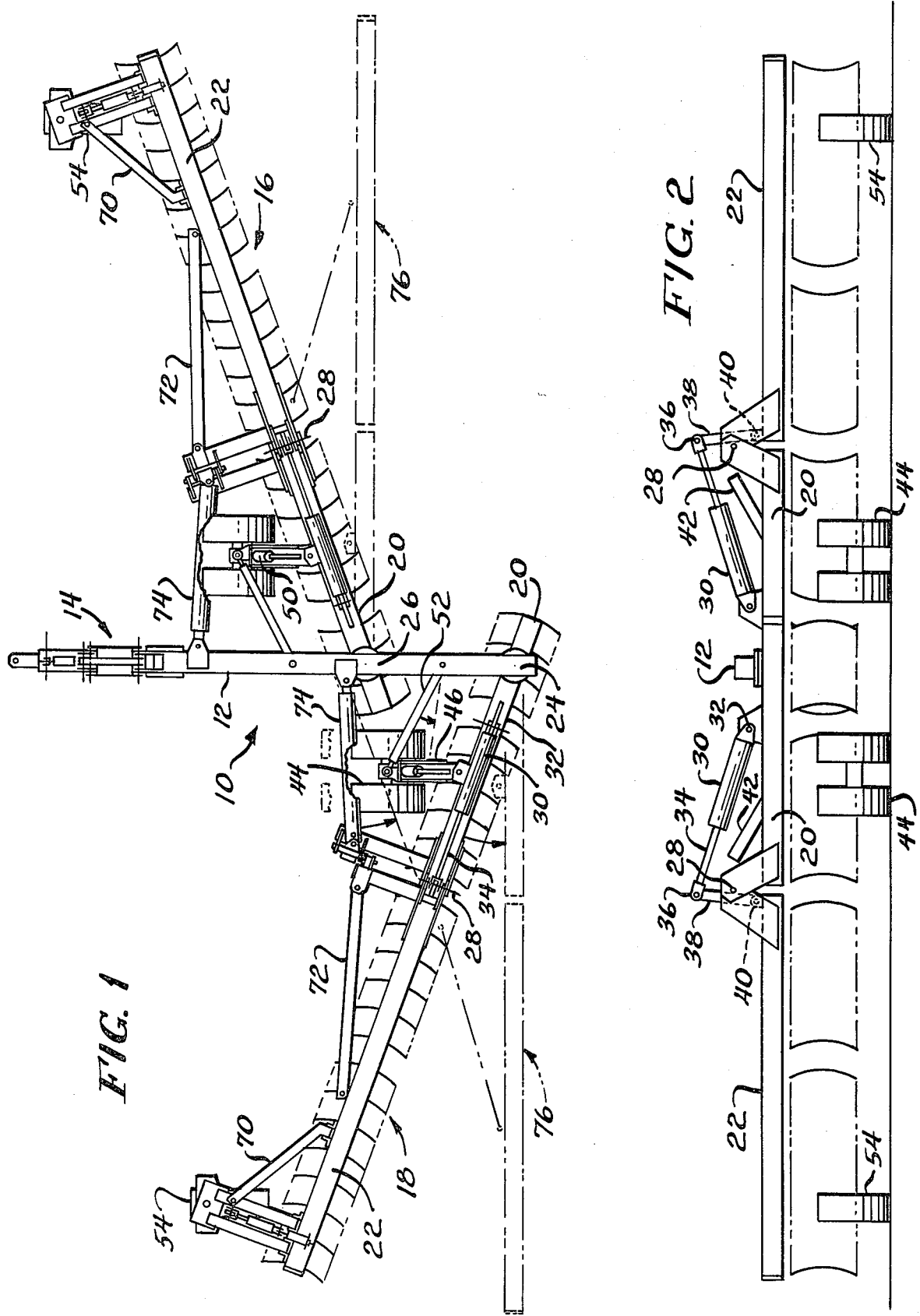

FOLDABLE TILLAGE IMPLEMENT

This invention relates to improvements in tillage implements such as a tandem or single line disk harrow and particularly to such implements having tool gang assemblies which in use extend laterally across the direction of pull of the tractor and are foldable to reduce overall width of the implement for transport.

In conventional disk harrows, the disk gangs are attached to a main frame overlay and in some instances also to overlay wings which are vertically hinged to one or both sides of the main frame. The disk gangs are raised and lowered relative to the ground by hydraulic-operated wheel linkages attached to the main frame overlay.

In U.S. Pat. Nos. 4,066,274, 4,211,287, 4,223,743 and 4,236,585, such implements are disclosed as having tool gangs supported on beams which extend laterally from opposed sides of a wheeled structure, and are swung horizontally thereon between laterally widespread working positions and folded back, fore-and-aft extending transport positions along opposed sides of the wheeled structure.

In accordance with this invention, the tool gang assemblies are mounted on the transport wheels and extend laterally from opposite sides of a fore-and-aft extending center pole to which they are connected for horizontal adjustment about vertical pivots spaced along the longitudinal axis of the center pole, one behind the other; and means are provided which act on the tractor hitch so that the center pole maintains a level attitude with respect to the ground such that the harrow is raised and lowered as a unit.

A feature of the invention is that the tool gang assembly units each comprise tool gang carrying inner beams which are horizontally adjustable about their connection to the center pole to set the tool gangs at a desired cutting angle. Said units also comprise tool gang carrying outer beams which are hinged end-to-end to the inner beams for folding over the inner beams and onto the center pole to reduce the width of the implement in transport.

Further, in accordance with the invention, the center pole is supported by the tool gang assembly units which connect thereto, the supported tool gang assembly units being raised and lowered relative to the ground by hydraulic-operated wheel linkages, which linkages attach directly to the tool gang assembly supporting beams and in turn raise and lower the center pole.

Still another feature of the invention is the hydraulic-operated hinged tongue which couples the center pole to a linkage tractor draw bar and is actuated by the wheel linkage operating hydraulic system with which it is in series such that the center pole maintains a level attitude with the ground.

A further feature of the invention is that means are provided which maintain forward alignment of the inner beam supporting wheels in both the transport and working positions of the implement. In the presently preferred embodiment of the invention, such means take the form of a parallel-four-bar linkage which is completed by a tie bar which connects across the wheel linkage to the center pole and extends generally parallel to a line drawn through the connection of the wheel linkage and the pivot on which the inner beam horizontally adjusts, the rigidity of said four-bar linkage being such as to absorb end thrust exerted on the wheels as when the implement turns it follows the tractor to which the implement is hitched.

Still another feature of the invention is that the inner beams of the tool gang assembly units are connected to the tractor hitch pole intermediate their ends wherefor the disks or other tools of the attached gangs lap the longitudinal axis of the tractor hitch pole and eliminate the need of a trailing cover gang of disks or tools as is conventional.

Many other advantages and features of the invention will be at once apparent or will become so upon consideration of the presently-preferred embodiment of the invention which now will be described in connection with the accompanying drawings.

IN THE DRAWINGS

FIG. 1 is a top plan view of a single disk harrow according to the invention and illustrates the tool gang assembly units in their laterally-extended working positions;

FIG. 2 is a rear view thereof;

Figure 3:
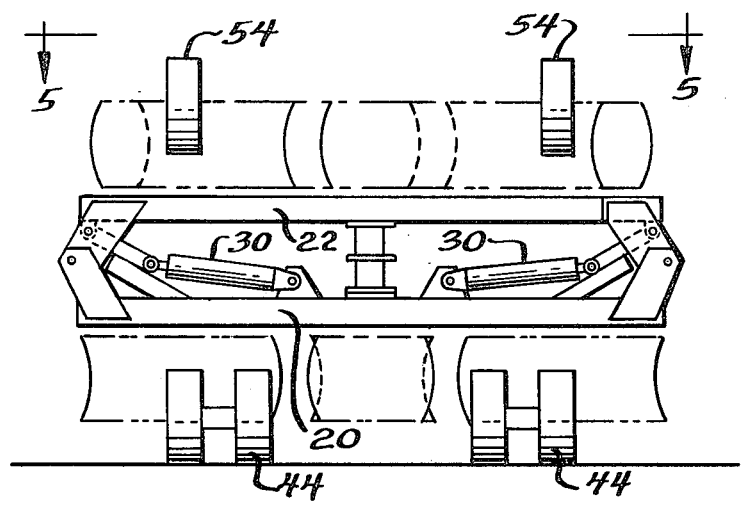
FIG. 3 is a view generally similar to FIG. 2 and shows the disk harrow with its tool gang assembly units folded over into their transport position on the center pole to which the tool gang assembly units are connected.

Referring now more particularly to the several views wherein like parts are identified by like reference numerals, FIG. 1 illustrates the invention embodied in a disk harrow 10 comprising a fore-and-aft extending center pole 12 having a tractor hitch on its forward end, the tractor hitch being identified generally at 14. Said center pole is the prime structural member of the illustrated tillage implement and connected thereto in trailing relation to the hitch 14 are right-hand and left-hand laterally extending tool gang assembly units 16, 18 which are adjustable horizontally relative to the center pole to set the tool gang at appropriate soil cutting angles relative to the center pole and the direction in which the harrow is pulled by the tractor in the tilling act.

Said tool gang assembly units each comprises a tool gang carrying inner beam 20 and a tool gang carrying outer beam 22. The inner beam 20 of the right-hand tool gnag assembly unit 16 is connected intermediate its ends to a first vertical pivot 26 which is located on the longitudinal axis of the center beam 12 and is spaced behind the tractor hitch 14. The inner beam of the left-hand tool gang assembly unit 18 is connected intermediate its ends to a second vertical pivot 24 which is also disposed on said longitudinal axis of the center pole but behind said first pivot 26. The resultant lapping of the disks or tools supported by the inner beam 20 across the longitudinal axis of the center pole assures that the ground is tilled by the implement across its full width, and thereby eliminates the need of a cover gang of tools trailing behind the harrow as was common in the past.

The outer beam 22 of each said tool gang assembly units 16, 18 is hingedly connected end-to-end to the inner beam 20 of the respective unit such that it is foldable thereover about a horizontal pivot 28 (FIG. 2)

which is shown spaced above and offset from the longitudinal axis of the inner and outer beams, and intermediate the adjacent ends of said beams.

At 30 is a lift hydraulic cylinder shown in FIG. 2 as hinged at 32 to the inner beam 20 and having its piston 34 pivotally connected at 36 to a link 38 which pivotally connects at 40 to the outer beam 22. Extension and retraction of piston 34 within lift cylinder 30 is effective to fold the outer beam 22 onto the inner beam (FIG. 4) and return it to its extended position (FIG. 2). Thus, to fold the outer beam 22 over the inner beam 20, piston 34 is retracted into cylinder 30. This causes link 38 to rock against pivot 28 causing the outer beam to swing upwardly on pivot 28. As its connection 36 moves inwardly of pivot 28, the weight of the outer beam is transferred to an incline plane element 42 along which it slides until the outer beam comes to rest flat on the center pole. In reverse, the outer beam is returned to its extended position by energizing hydraulic cylinder 30 forcing piston 34 therefrom, its connection 36 moving along incline plane element 42 until the weight of the outer beam transfers to pivot 28 via link 38.

Figure 4:
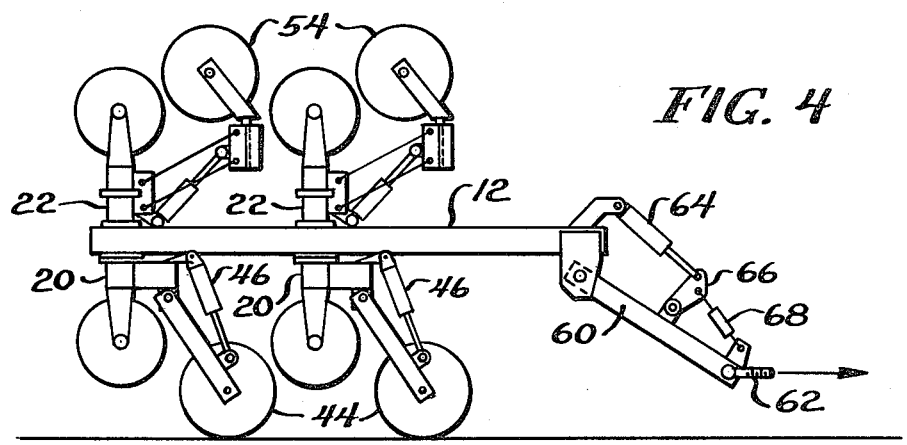
FIG. 4 is a side elevational view of the disk harrow in its transport position, the view being taken from the right-hand side of FIG. 3.
Figure 5:
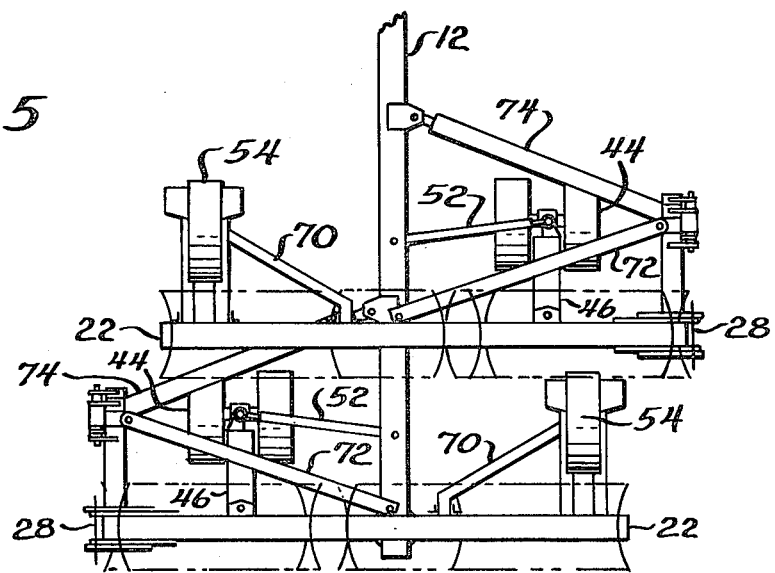
FIG. 5 is a top plan view of the disk harrow showing the outer beams and their disk gangs folded over their associated inner beams and lying flat in close side-by-side relation on the center pole.

Referring still to FIG. 1, and considering FIG. 4 therewith, the inner beam 20 of the tool gang assembly units 16, 18 is supported adjacent its connection to the outer beams by a dual wheel supporting structure 44. As shown best in FIG. 4, said dual wheels 44 are rotatably mounted on a supporting link 48 which is pivotally connected to one side of inner beam 20. An operating hydraulic cylinder 46 is shown connected between said dual wheels 44 and the supporting link 48 such that with extension and retraction of its piston, the related height of the wheels 44 to the inner beam 20 can be changed to effectively raise and lower wheels 44 between a transport position where the disk tools are supported above the ground level and an operating position wherein the wheels are retracted to above the disk tools and thereby effectively lower the tools to a desired soil cutting depth.

A feature of the invention is that means in the form of a four-bar-parallel-linkage serve to maintain the dual wheels generally parallel to the longitudinal axis of the center pole, locking the dual wheels in their forward aligned position with sufficient rigidity to absorb end thrust with turning of the disk harrow as it is pulled behind the tractor. As shown best in FIG. 1, said four-bar-parallel-linkage is established by a tie bar 52 which has its opposite ends pivotally connected between wheel supporting link 46 and the center pole 12. The length of tie bar 52 corresponds to the spacing of the pivotal connection of the wheel operating linkage 48 from the pivotal connection of the inner beam to the center pole bar; and the separation of the pivotal connection of the tie bar to the center pole corresponds to the spacing of the pivot connection of the wheel linkage to the tie bar.

In accordance with the invention, the outer end of the outer beam is also supported on a swivel type wheel 54 such that it is capable of following the pull of the tractor on the center pole 12. A suitable hydraulic linkage effectively raises and lowers the support for swivel wheel 54 such that the disk tools carried by the inner and outer beams are disposed at a common level. This is true whether the implement is in its transport position or set at any of the different soil depths to which the disk tools may be lowered.

As illustrated in FIG. 4, a hydraulic-operated hinged tongue 60 couples the center pole 12 to the tractor drawbar connector 62 and hydraulic cylinders 64 connects between the forward end of the outer pole 12 and a link 66 which connects to tongue 60 intermediate its connection to the center pole and the tractor drawbar connector 62. A mechanical leveling jack 68 between said link 66 and the tongue 60 compensates the hitch 14 for different tractor heights. Leveling of the total disk harrow 10 is assured by reason that hydraulic cylinder 64 is connected in series with the hydraulic cylinders 30 and 46 which raise and lower the wheels supporting the outer and inner beams respectively. Thus, the hydraulic lift system employs a master cylinder and a pair of slave cylinders, the system's hydraulic hook ups running in series through the master cylinder 46 on the inner lift wheels 44 to and through the slave cylinders 50 on the outer lift wheels 54 and to and through the slave cylinders 64 on the tongue 60 which are mechanically locked together. Thus, the whole implement, including its right and left sides, raises and lowers with the center pole 12 as a unit.

Referring again to FIG. 1, it will be understood that in the tilling act, the disk tool gang assembly units 16 and 18 are set at an appropriate angle to the pull of the tractor represented by the longitudinal axis of the center pole to which said units are attached. Depending on the tillable condition of the soil, the cutting angle at which the tools are set, as well as the soil cutting depth, may be advantageously varied.

As shown in FIG. 1, the position of the outer wheels 54 is reinforced by an inclined fixed truss bar 70 which is rigid to the wheel supporting links and the outer beam 22. Similarly, a second inclined truss bar 72 rigid to the inner beam and the hinge half is relied upon to fix the location of the hinge connection of the outer beam to the inner beam and the inner beam is reinforced by an inclined adjustable length telescoping truss bar 74 which also releasably locks the inner beam and, thereby, the tool gang assembly unit of which it is a component at one of a selected soil cutting angle. The adjustable length truss bar 74 may be powered by a hydraulic cylinder which introduces a variable cutting angle.

In the fully extended position of the adjustable length truss bar 4, it serves to fix the tool gang supporting units in their open or extended position as illustrated by dotted lines at 76. As earlier explained, it is important to be able to fold the outer beam 22 over the inner beam onto the center pole to reduce the overall width of the harrow for travel along the roadway or through a field gate.

In the implement illustrated by the patent drawing, this may be possible only when the tool gang assembly units are disposed perpendicular to the longitudinal axis of the center pole and then only when the pivotal connections of the tool gang assembly units are sufficiently spaced to provide clearance for the wheel supporting structures on which the inner and outer beams are mounted and/or the portions of the inner beams 20 which lap the longitudinal axis of the center pole which hitches to the tractor. This is assured by locking of the adjustable length truss bars 74 in their fully extended position wherefor the tool gang assembly units are maintained perpendicular to the longitudinal axis of the center pole as is illustrated by the phantom lines 76 in FIG. 1. If the folded outer beams do not lap the center pole, then the tool gang assembly spacing along the center pole can be decreased, resulting in a further shortened overall disk width.

Although the invention thus far has been discussed as embodied in a single line disk harrow, it will be understood that the invention also has utility in other tillage implements including so-called tandem implements wherein two or more lines of tool gangs are arranged across the center pole which serves to hitch the implement to behind the tractor. In such an event, each pair of tool gangs assembly units may be assembled and arranged to be operable as above described.

Having described the invention, what is claimed is:

1. A disk harrow comprising
   a fore-and-aft extending generally horizontal center pole defining a longitudinal axis along the centerline thereof
   a tractor hitch mounted on the forward end of said center pole symmetrically disposed with respect to said centerline and
   a pair of vertical pivots spaced therebehind on the longitudinal axis of said center pole and normal thereto one behind the other;
   a pair of laterally extending tool gang assembly units one on each side of said center pole and each said assembly unit comprising
   a wheel-supported tool-gang-carrying inner beam connected intermediate its ends to one of said vertical pivots so as to be horizontaly moveable thereabout between a working position in which the paired tool gang assembly units assume a vee-shape relative to the travel of the harrow under the pull of a tractor hitched to the center pole, and a transport position in which the tool gang assembly units are disposed generally normal to the center pole and parallel to each other;
   a wheel-supported tool-gang-carrying outer beam having its inner end hingedly connected to the adjacent outer end of the inner beam so as to be foldable vertically over the inner beam and generally parallel thereto across the center pole when said assembly units are disposed normal to the center pole; and
   means selectively locking said tool gang assembly units in their working and transport positions.

2. A disk harrow according to claim 1 having four-bar linkage means maintaining forward alignment of the wheeled supports on which the inner beams of the tool gang assembly units are mounted.

3. A disk harrow according to claim 1 whereby the rearward one of said inner beams presents tools on both sides of the longitudinal axis of said center pole.

4. A foldable tillage implement comprising
   a fore-and-aft extending center pole defining a longitudinal axis along the centerline thereof, a tractor hitch mounted on the forward end of said centerpole symmetrically disposed with respect to said centerline,
   a pair of tool gang assembly units each including:
   a tool gang carrying inner beam connected to the center pole behind the tractor hitch for horizontal adjustment about a vertical pivot located on the longitudinal axis of the center pole and normal thereto,
   the vertical pivot to which the inner beam of one of said tool gang assembly unit is horizontally adjusted being spaced behind the vertical pivot to which the inner beam of the other tool gang assembly unit is connected, and
   an outer beam hingedly connected to the adjacent end of the inner beam of each said tool gang assembly units for folding on a horizontal pivot over the inner beam and onto the center pole,
   wheel supports for each said inner and outer beams including means for raising and lowering said wheels relative to the tools carried by said beams; and
   means responding to the raising and lowering of said wheels to maintain the attitude of the center level to the ground.

5. A foldable tillage implement according to claim 4 wherein said vertical pivots are spaced apart along the longitudinal axis of the fore-and-aft extending center pole such that when the tool gang assembly units are disposed normal to said longitudinal axis of the center poles, the outer beam can be folded over the inner beam onto the center pole and lie flat in close side-by-side relation.

6. A foldable tillage implement according to claim 5 further including locking means for releasably locking the inner beam of said units to the center pole when the units are disposed perpendicular to the longitudinal axis of the center pole.

7. A foldable tillage implement according to claim 4 includes four-bar linkage means for maintaining the forward alignment of the wheels supporting the inner beams and generally parallel to the longitudinal axis of the center pole.

8. A foldable tillage implement comprising
   a fore-and-aft extending center pole having a tractor hitch on its forward end,
   a pair of tool gang assembly units each said assembly unit including:
   a tool gang carrying inner beam connected to the center pole behind the tractor hitch for horizontal adjustment about a vertical pivot located on the longitudinal axis of the center pole and normal thereof intersecting the same at right angles,
   the vertical pivot to which the inner beam of one of said tool gang assembly unit is horizontally adjusted being spaced behind the vertical pivot to which the inner beam of the other tool gang assembly unit is connected, and
   an outer beam hingedly connected to the adjacent end of the inner beam of each said tool gang assembly units for folding on a horizontal pivot over the inner beam and onto the center pole,
   wheel supports for each said inner and outer beams including means for raising and lowering said wheels relative to the tools carried by said beams;
   means responding to the raising and lowering of said wheels to maintain the attitude of the center pole level to the ground; and
   means for maintaining the forward alignment of the wheels supporting the inner beams generally parallel to the longitudinal axis of the center pole characterized in that the recited means for maintaining alignment of the inner beam supporting wheels includes a tie bar pivotally connected at its opposed ends to the wheel support and the center pole, said tie bar being generally parallel to a line connecting the pivotal connection of the wheel support to the inner beam and the vertical pivot on which the tool gang assembly unit is adjustably mounted.

9. A foldable tillage implement according to claim 8 wherein the wheel support for the outer beam is located adjacent the outer end of the tool gang assembly unit and its supporting wheel is swivelly connected thereto.

* * * * *